US012568375B2

(12) United States Patent　(10) Patent No.: US 12,568,375 B2

Perelygin　(45) Date of Patent: Mar. 3, 2026

(54) METHOD FOR PAIRING AN ELECTRONIC ACCESSORY PROVIDED WITH ONE OR MORE MOTION SENSORS TO A HOUSEHOLD APPLIANCE CONNECTED TO A COMPUTER NETWORK

(71) Applicant: ELECTROLUX APPLIANCES AKTIEBOLAG, Stockholm (SE)

(72) Inventor: Igor Perelygin, Stockholm (SE)

(73) Assignee: ELECTROLUX APPLIANCES AKTIEBOLAG, Stockholm (SE)

( * ) Notice: Subject to any disclaimer, the term of this patent is extended or adjusted under 35 U.S.C. 154(b) by 24 days.

(21) Appl. No.: 18/839,833

(22) PCT Filed: Feb. 21, 2022

(86) PCT No.: PCT/EP2022/054211

§ 371 (c)(1),
(2) Date: Aug. 20, 2024

(87) PCT Pub. No.: WO2023/156011

PCT Pub. Date: Aug. 24, 2023

(65) Prior Publication Data

US 2025/0150831 A1　May 8, 2025

(51) Int. Cl.
*H04W 12/50*　(2021.01)
*H04W 12/68*　(2021.01)

(52) U.S. Cl.
CPC ........... *H04W 12/50* (2021.01); *H04W 12/68* (2021.01)

(58) Field of Classification Search
None
See application file for complete search history.

(56) References Cited

U.S. PATENT DOCUMENTS 8,909,194 B2 * 12/2014 Madhavan .............. H04L 67/14
455/457
9,503,969 B1 * 11/2016 Zakaria ............. H04W 52/0229
(Continued)

FOREIGN PATENT DOCUMENTS

DE 102013205550 A1 10/2014
EP 3001637 A1 3/2016
WO WO-2016040176 A1 * 3/2016 ......... H04L 41/0806

OTHER PUBLICATIONS

Electrolux Appliances Aktiebolag, International Patent Application No. PCT/EP2022/054211, International Search Report and Written Opinion, Sep. 15, 2022.

*Primary Examiner* — Michael Pyzocha
(74) *Attorney, Agent, or Firm* — Moore & Van Allen PLLC

(57) ABSTRACT

A method for pairing an electronic accessory provided with one or more motion sensors to a household appliance connected to a computer network. The method includes transmitting a connection request from the electronic accessory to the household appliance, transmitting an identification code request from the household appliance to the computer network, generating an identification code, transmitting and to a portable device, displaying by the portable device one or more movements, uniquely corresponding to the identification code, moving the electronic accessory to reproduce the one or more movements, detecting the performed one or more movements, transmitting to the household appliance a movement information uniquely corresponding to the detected one or more movements, and establishing a trusted wireless connection between the electronic accessory and the household appliance if the movement information, or an uniquely corresponding information thereof, is in a prefixed relation with the identification code or an identification information.

24 Claims, 9 Drawing Sheets

(56)         References Cited

U.S. PATENT DOCUMENTS

Figure 1:
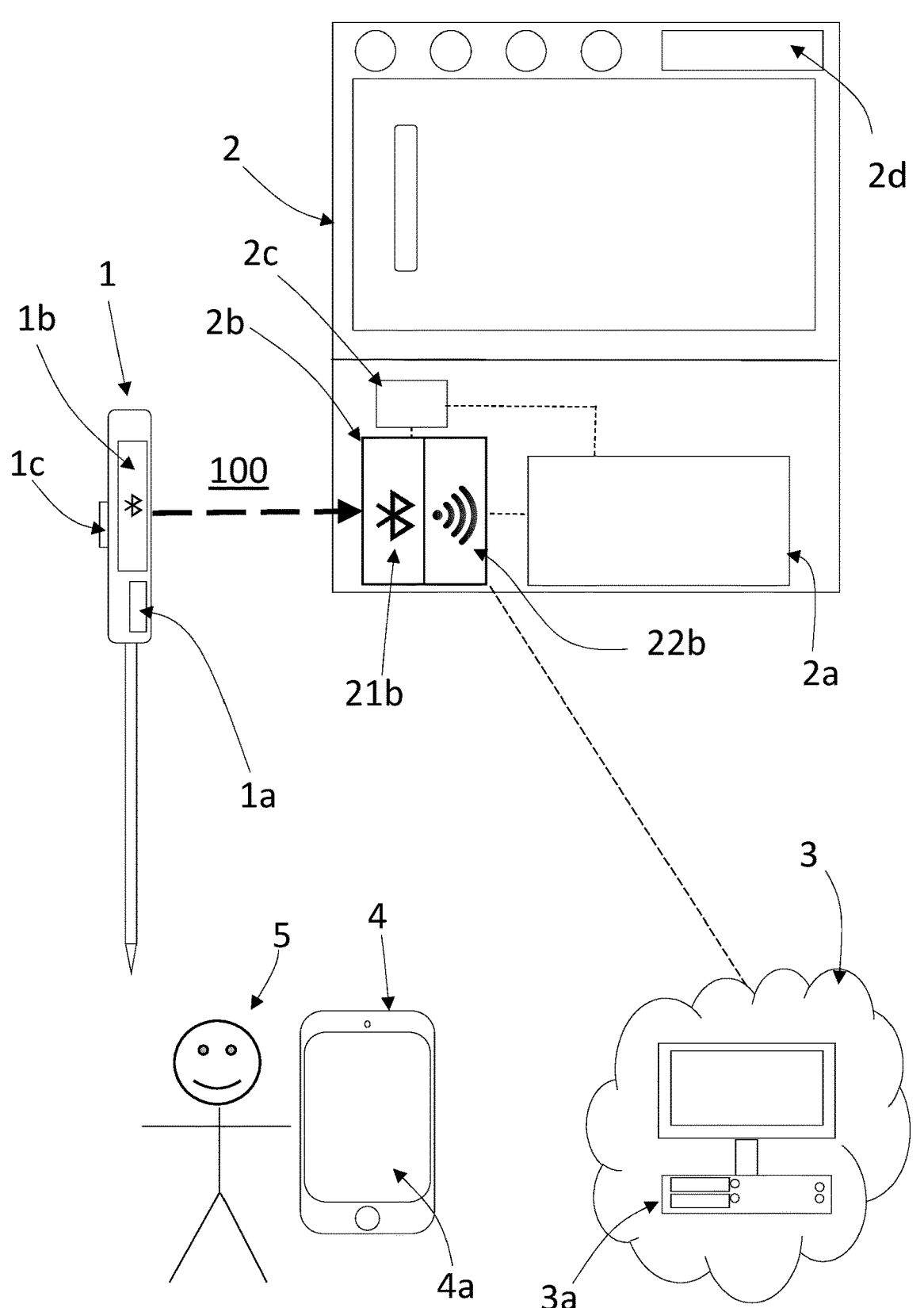
Figure 2:
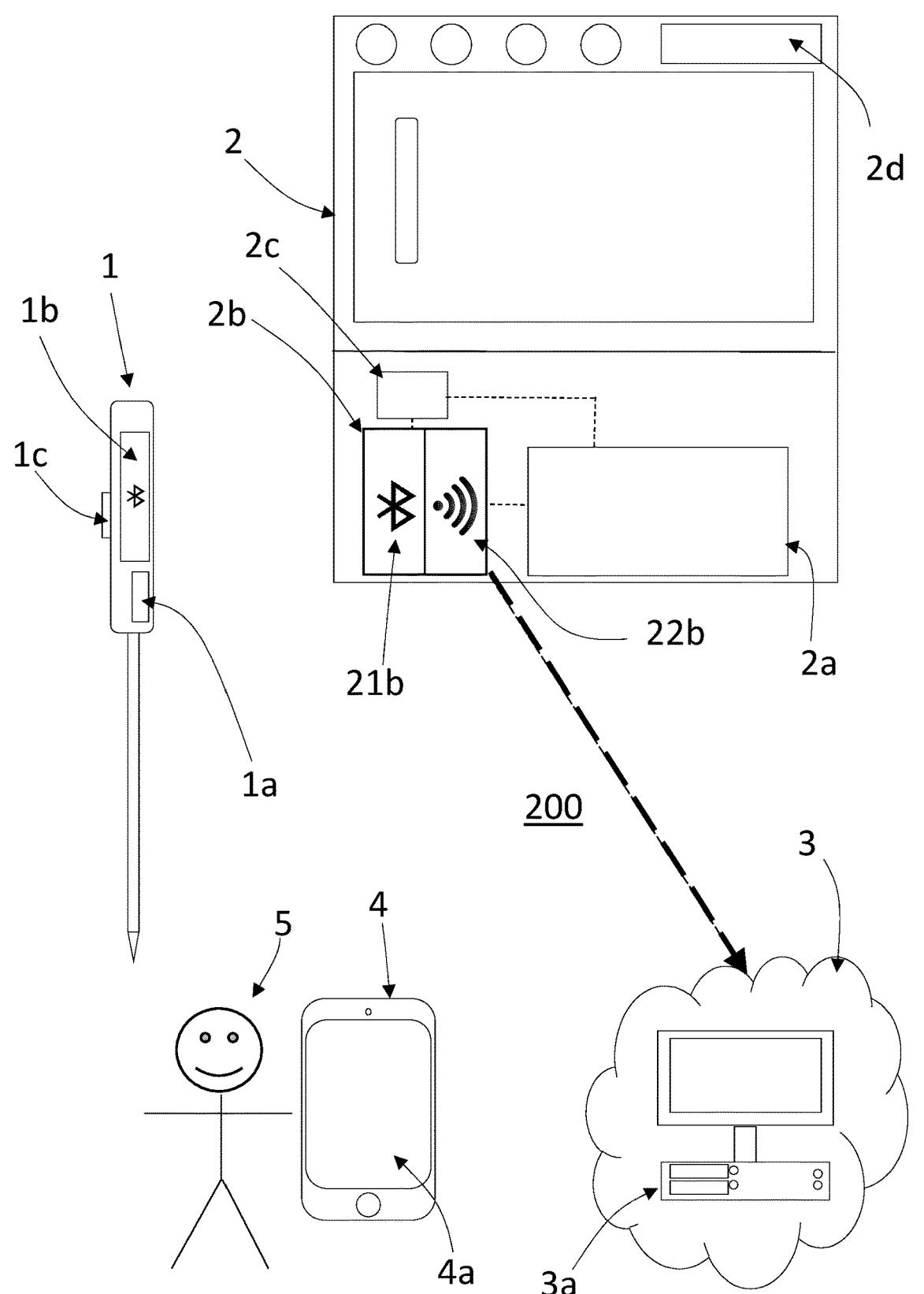
Figure 3:
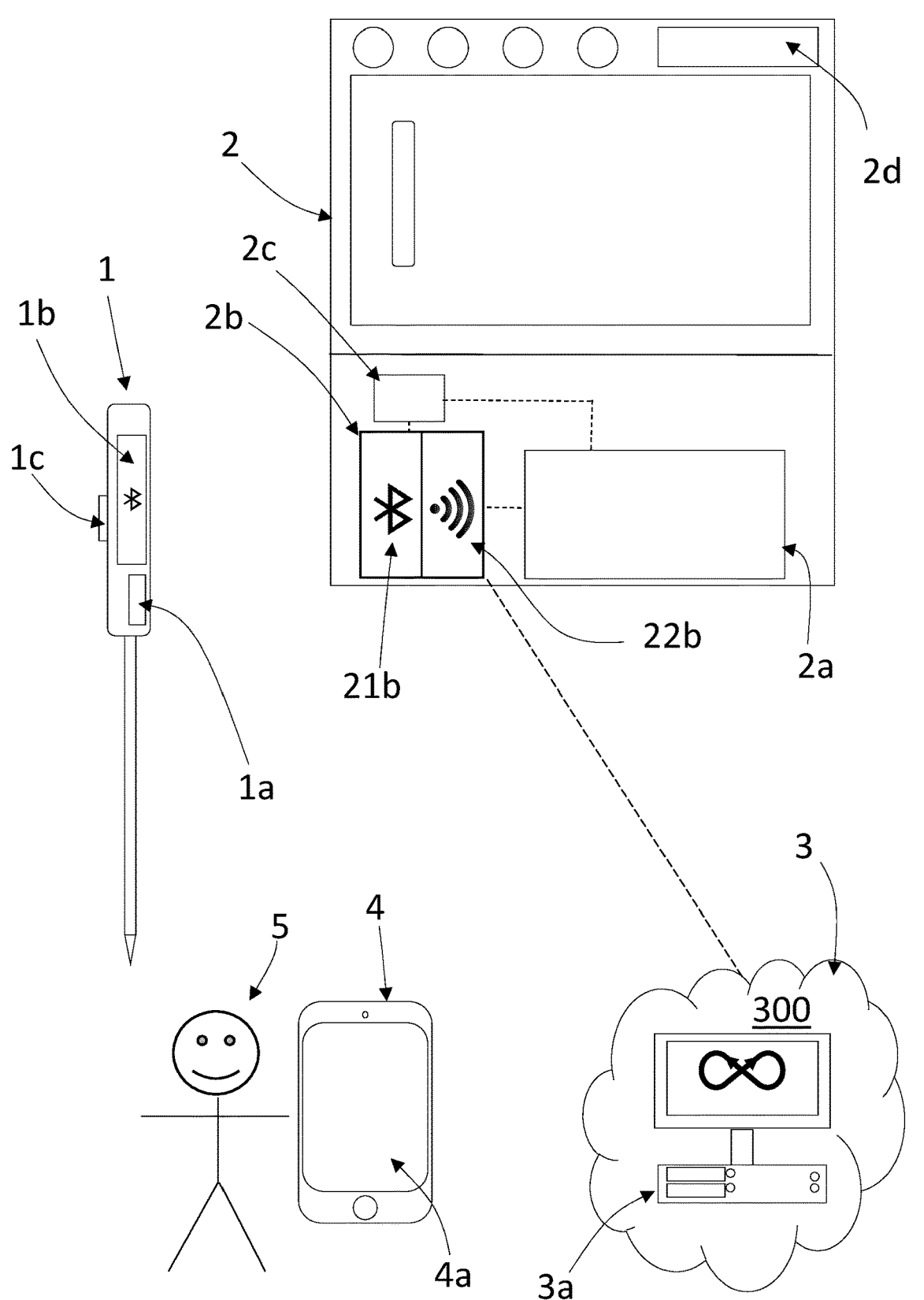

| | | | | |
|---|---|---|---|---|
| 12,457,499 | B2 * | 10/2025 | Kauffmann | H04W 12/55 |
| 2013/0014232 | A1 * | 1/2013 | Louboutin | H04L 67/14 |
| | | | | 726/5 |
| 2013/0065517 | A1 * | 3/2013 | Svensson | H04W 12/06 |
| | | | | 455/39 |
| 2013/0223279 | A1 * | 8/2013 | Tinnakornsrisuphap | |
| | | | | H04W 12/50 |
| | | | | 370/254 |
| 2014/0220888 | A1 * | 8/2014 | Shimshoni | H04W 12/50 |
| | | | | 455/41.1 |
| 2015/0373760 | A1 * | 12/2015 | Palin | H04W 12/50 |
| | | | | 455/41.2 |
| 2016/0360341 | A1 * | 12/2016 | Srivatsa | H04L 67/306 |
| 2017/0289798 | A1 * | 10/2017 | Weizman | H04L 63/062 |
| 2020/0036569 | A1 | 1/2020 | Mekenkamp | |
| 2020/0178067 | A1 * | 6/2020 | Lee | H04L 9/001 |
| 2020/0233949 | A1 * | 7/2020 | Xia | H04W 12/08 |
| 2022/0021554 | A1 * | 1/2022 | Hwang | H04W 76/10 |
| 2023/0070667 | A1 * | 3/2023 | Varada | H04W 4/80 |
| 2023/0189357 | A1 * | 6/2023 | Yi | H04W 12/06 |
| | | | | 370/329 |
| 2023/0262469 | A1 * | 8/2023 | Tan | H04W 76/14 |
| | | | | 455/411 |
| 2023/0345237 | A1 * | 10/2023 | Kim | H04W 48/10 |
| 2024/0056808 | A1 * | 2/2024 | Kim | G06F 21/44 |

* cited by examiner

METHOD FOR PAIRING AN ELECTRONIC ACCESSORY PROVIDED WITH ONE OR MORE MOTION SENSORS TO A HOUSEHOLD APPLIANCE CONNECTED TO A COMPUTER NETWORK

CROSS-REFERENCE TO RELATED APPLICATIONS

This application is a National Stage Patent Application (filed under 35 § U.S.C. 371) of International Application No. PCT/EP2022/054211, filed Feb. 21, 2022, of the same title, (and published Aug. 24, 2023, as International Publication No. WO 2023/156011). Each of the foregoing application and publication is hereby incorporated by reference in its entirety.

The present invention relates to a method for pairing an electronic accessory provided with one or more motion sensors to a household appliance connected to a computer network.

Nowadays, household appliances, like for example refrigerators, ovens, cooking hobs, cooking hoods, dishwashers, laundry washing machines, laundry driers, laundry washer-driers, vacuum cleaners, etcetera, have often the possibility to be connected to a computer network, for example the Internet, so as to be able to exchange data with other electric/electronic appliances and/or with one or more users via such a computer network.

Electronic accessories are also known, for example temperature probes, pans or spoons provided with temperature probes, etcetera, which can be directly connected to household appliances, so as to exchange data therebetween; some of these accessories are also provided with one or more motion sensors, for example an accelerometer and/or a gyroscope, able to detect the position and/or the motion of such accessories.

In most cases, the connection between these electronic accessories and the household appliances is a wireless connection.

The wireless connection of an electronic accessory to a household appliance requires first of all pairing the two devices, i.e. setting up an initial linkage between such devices to allow communications therebetween.

In order to prevent the establishment of fraudulent, or anyway unwanted, wireless connections between a household appliance and an electronic accessory, and more in general in order to establish a trusted wireless connection between such devices, it would be advisable to allow the establishment of the wireless connection only after the exchange and the verification of an identification code, e.g. a password or a PIN code, between the household appliance and the electronic accessory.

In order to exchange and verify such an identification code, the household appliance and/or the electronic accessory needs to be provided with an input/output user interface allowing a user to view and/or to confirm the identification code.

Anyway, since many household appliances are provided only with a limited and rather simple user interface, and most of the electronic accessories suitable to be connected to a household appliance don't comprise a user interface at all, there is the problem that in many cases the identification code can't be exchanged, and therefore a trusted wireless connection can't be established.

The aim of the present invention is therefore to provide a method for pairing an electronic accessory provided with one or more motion sensors to a household appliance connected to a computer network, so as to establish a trusted wireless connection therebetween, without requiring such household appliance or electronic accessory to be provided with an input/output user interface.

Within this aim, a further object of the invention is to provide a method for pairing an electronic accessory provided with one or more motion sensors to a household appliance connected to a computer network, which improves the safety of the wireless connection.

A further object of the invention is to provide a method for pairing an electronic accessory provided with one or more motion sensors to a household appliance connected to a computer network, which can be easily adapted to the specific electronic accessory to be paired.

Another object of the invention is to provide a method for pairing an electronic accessory provided with one or more motion sensors to a household appliance connected to a computer network, which is easy and immediate to be understood and performed.

Applicant has found that by displaying, on the display of a portable device connected to the same computer network of a household appliance, one or more movements to be performed by an electronic accessory, uniquely corresponding to an identification code generated by a network processing unit of the computer network, and transmitted to the portable device and to the household appliance following a request of the household appliance, and by moving the electronic accessory in such a way to reproduce the displayed one or more movements, by detecting the one or more movements of the electronic accessory by means of one or more motion sensors of the electronic accessory, by comparing a movement information uniquely corresponding to the detected one or more movements, or a uniquely corresponding information thereof, to the identification code stored in the household appliance or to an identification information uniquely corresponding to such an identification code, and by establishing a trusted wireless connection between the electronic accessory and the household appliance if the movement information, or uniquely corresponding information thereof, is in a prefixed relation with the identification code or identification information, it is possible to obtain a trusted wireless connection between the electronic accessory and the household appliance without the need of an input/output user interface on the electronic accessory or on the household appliance.

The present invention is thus related to a method for establishing a trusted wireless connection between an electronic accessory and a household appliance, which comprises the following steps:

transmitting a connection request from the electronic accessory to the household appliance;

transmitting an identification code request from the household appliance to a computer network;

generating an identification code in the computer network, the identification code being associated or associable to a prefixed movement to be applied to the electronic accessory to allow trusted wireless connection;

transmitting the identification code to the household appliance;

transmitting the identification code to a portable device;

displaying on the portable device an information related to the prefixed movement to be applied to the electronic accessory;

detecting the movement of the electronic accessory by means of one or more motion sensors;

transmitting to the household appliance a movement information associated with the detected movement;

comparing the detected movement associated with the movement information with the prefixed movement associated with the identification code; and establishing a trusted wireless connection between the electronic accessory and the household appliance if the detected movement is in a prefixed relation with the prefixed movement.

More in detail, the present invention is related to a method for pairing an electronic accessory provided with one or more motion sensors to a household appliance connected to a computer network, in order to establish a trusted wireless connection therebetween, wherein the electronic accessory comprises a first wireless communication system, and the household appliance comprises a processing unit, a second wireless communication system and a memory unit, the method comprising the following steps:

transmitting a connection request from the electronic accessory to the household appliance, by means of the first wireless communication system;

after transmitting the connection request to the household appliance, transmitting, by means of the second wireless communication system, an identification code request from the household appliance to the computer network;

after transmitting the identification code request to the computer network, generating an identification code by means of a network processing unit comprised in the computer network, transmitting the identification code to the household appliance and transmitting the identification code to a portable device wirelessly connected to the computer network and provided with a display, the household appliance storing the identification code in the memory unit;

after transmitting the identification code to the portable device, displaying, by the display of the portable device, an information related to one or more movements to be performed by the electronic accessory, uniquely corresponding to the identification code;

after displaying, by means of the display of the portable device, an information related to one or more movements to be performed by the electronic accessory, moving the electronic accessory in such a way to reproduce the one or more movements, and detecting the one or more movements performed by the electronic accessory while reproducing the one or more movements by means of the one or more motion sensors;

simultaneously to or after detecting the one or more movements performed by the electronic accessory, transmitting to the household appliance, by means of the system, a movement first wireless communication information uniquely corresponding to the detected one or more movements;

after transmitting to the household appliance the movement information, comparing, by means of the processing unit, the movement information, or a uniquely corresponding information thereof, to the identification code stored in the memory unit or to an identification information uniquely corresponding to the identification code, and establishing a trusted wireless connection between the electronic accessory and household appliance if the movement information, or uniquely corresponding information thereof, is in a prefixed relation with the identification code or identification information.

In an advantageous embodiment, the steps of transmitting the identification code to the household appliance and transmitting the identification code to a portable device are executed substantially at the same time.

In a further advantageous embodiment, the steps of transmitting the identification code to the household appliance and transmitting the identification code to a portable device are executed at different times.

In another advantageous embodiment, wherein the portable device is wirelessly connected to the household appliance, the identification code is first transmitted from the computer network to the portable device, and then from the portable device to the household appliance.

In an advantageous embodiment, the step of transmitting a connection request from the electronic accessory to the household appliance is performed as a result of an action performed by a user on the electronic accessory.

In an advantageous embodiment, the step of transmitting a connection request from the electronic accessory to the household appliance is performed as a result of the one or more motion sensors detecting a prefixed motion of the electronic accessory.

In a further advantageous embodiment, the electronic accessory comprises a first input device, and the step of transmitting a connection request from the electronic accessory to the household appliance is performed as a result of a user operating the first input device.

In an advantageous embodiment, the household appliance comprises a user interface, and the method comprises, after transmitting a connection request from the electronic accessory to the household appliance, and before transmitting, by means of the second wireless communication system, an identification code request from the household appliance to the computer network, a step of confirming the intention to connect the household appliance to the electronic accessory by operating the user interface.

In an advantageous embodiment, the wireless connection between the electronic accessory and the household appliance is a Bluetooth connection, or a Bluetooth low energy connection.

In an advantageous embodiment, the wireless connection between the household appliance and the computer network is a Wi-Fi connection.

In an advantageous embodiment, the second wireless communication system comprises a Bluetooth module, operating according to the Bluetooth standard or to the Bluetooth Low Energy standard.

In an advantageous embodiment, the second wireless communication system comprises a Wi-Fi module, operating according to the Wi-Fi standard.

In an advantageous embodiment, the one or more motion sensors comprise an accelerometer and/or a gyroscope.

In an advantageous embodiment, the computer network comprises a LAN network, a MAN network, a WAN network, or the Internet.

In an advantageous embodiment, the portable device is a smartphone or a tablet or a smartwatch or a portable computer.

In an advantageous embodiment, the one or more movements to be performed by the electronic accessory is displayed by the display as one or more arrows and/or one or more lines and/or one or more texts, indicating in which direction or directions or along which path the electronic accessory has to be moved in order to perform the one or more of movements.

In an advantageous embodiment, the electronic accessory is a temperature probe, or a pan or pot provided with one or more electronic functions, or a an accessory, provided with one or more sensors, configured to be loaded in a laundry treating chamber of a laundry washing machine or laundry dryer or washer-drier to monitor one or more properties and/or physical quantities related to the laundry and/or to a fluid contained in the laundry treating chamber, or a stain removal pen, or an air quality sensor for fridges, or a bottle temperature monitor, or a cap for a bottle comprising one or more sensors for detecting one or more properties and/or physical quantities related to a liquid contained in the bottle, or a stand-alone filter with capability to notify when filtering element should be changed, or a digital camera.

In an advantageous embodiment, the network processing unit is or comprises a computer or a server.

In an advantageous embodiment, the network processing unit is provided with an identification code generation algorithm generating the identification code.

In an advantageous embodiment, the method comprises the step of updating and/or modifying the identification code generation algorithm directly at the network processing unit.

In an advantageous embodiment, the method comprises adapting the identification code generation algorithm to a specific electronic accessory in a centralized manner, at the network processing unit.

Advantageously, if the movement information, or uniquely corresponding information thereof, is not in the prefixed relation with the identification code o identification information, a trusted wireless connection between the electronic accessory and the household appliance is not established.

Other advantages and features of the method according to the present invention will be clear from the following detailed description, provided only as a not limitative example, in which:

FIGS. 1 to 9 schematically illustrate the successive steps of an advantageous embodiment of the method according to the present invention.

The method according to the invention, an advantageous embodiment of which is schematically illustrated in attached figures, allows to pair an electronic accessory 1 provided with one or more motion sensors, schematically illustrated as a rectangle 1a, to a household appliance 2, connected to a computer network 3, in order to establish a trusted wireless connection therebetween.

Advantageously, the electronic accessory 1 can be, for example, a temperature probe (e.g. the temperature probe 1 schematically illustrated in attached figures), a pan or pot comprising a temperature probe and/or one or more other electronic devices, an ultrasonic stain removal pen, an air quality sensor for fridges, a bottle temperature monitor (e.g. a wine temperature monitor, a stand-alone filter with capability to notify when filtering element should be changed, a digital camera, etcetera.

In embodiment, not a further advantageous illustrated, the electronic accessory 1 can be an accessory provided with one or more sensors, configured to be loaded in a laundry treating chamber (e.g. a washing or drying rotating drum) of a laundry washing machine or laundry dryer or washer-drier, not illustrated, to monitor one or more properties and/or physical quantities (e.g. the temperature, the water and/or detergent quality, etcetera) related to the laundry and/or to a fluid (e.g. water, water mixed with detergent, air, etcetera) contained in such a laundry treating chamber; such kind of multi-sensor accessory is typically called "smart ball", since it is generally, but not necessarily, shaped as a ball.

In a further advantageous embodiment, the electronic accessory 1 can be a cap, not illustrated, for a bottle, comprising one or more sensors for detecting one or more properties and/or physical quantities (e.g. the temperature) related to a liquid (e.g. water or wine) contained in the bottle; this kind of cap is typically called "smart bottle cap".

Advantageously, the one or more motion sensor 1a can comprise an accelerometer and/or a gyroscope.

Advantageously, the household appliance 2 can be, for example, an oven (e.g. the oven 2 schematically illustrated in attached figures) a refrigerator, a freezer, a cooking hob, a cooking hood, a dishwasher, a laundry washing machine, a laundry drier, a laundry washer-drier, a vacuum cleaner, etcetera.

According to the invention, the electronic accessory 1 comprises a first wireless communication system, schematically illustrated in attached figures a by rectangle 1b, configured for wirelessly transmitting and receiving information, respectively to and from the household appliance 2.

Advantageously, the first wireless communication system 1b operates (i.e. transmits and receives information) according to the Bluetooth standard, more preferably according to the Bluetooth Low Energy standard; anyway, according to the invention, other wireless communication standards (e.g. the Wi-Fi standard) are possible.

According to the invention, the household appliance 2 comprises a processing unit, schematically illustrated in attached figures by rectangle 2a, comprising, for example, a microprocessor, not illustrated.

According to the invention, the household appliance 2 comprises a second wireless communication system, schematically illustrated in attached figures by rectangle 2b, configured for wirelessly transmitting and receiving information, respectively to and from the electronic accessory 1 (and more preferably to and from the first wireless communication system of the electronic accessory 1), and to and from the computer network 3.

In an advantageous embodiment, the second wireless communication system 2b comprises a Bluetooth module, schematically illustrated in attached figures by a rectangle 21b, operating (i.e. transmitting and receiving information) according to the Bluetooth standard, more preferably according to the Bluetooth Low Energy standard.

In an advantageous embodiment, the second wireless communication system 2b comprises, in addition or as an alternative to the Bluetooth module 21b, a Wi-Fi module, schematically illustrated in attached figures by a rectangle 22b, operating (i.e. transmitting and receiving information) according to the Wi-Fi standard.

Advantageously, the household appliance 2 is connected to the computer network 3 by the second wireless communication system 2b, more preferably by the Wi-Fi module 22b.

According to the invention, the household appliance 2 comprises a memory unit (e.g. a Random Access Memory module), schematically illustrated in attached figures by a rectangle 2c.

Advantageously, the computer network 3 to which the household appliance 2 is connected can be, for example, a local area network (LAN), a metropolitan area network (MAN), a wide area network (WAN), or the Internet.

The method according to the invention comprises the step (schematically illustrated for example in FIG. 1) of transmitting (100) a connection request from the electronic accessory 1 to the household appliance 2, by means of the first wireless communication system 1b.

If the first wireless communication system 1b operates according to the Bluetooth standard, or the Bluetooth Low Energy standard, the step of transmitting (100) a connection request is advantageously performed during the so called "advertising phase" of the Bluetooth transmission, that is a phase during which the electronic accessory 1 broadcasts information defining its intentions to be connected to other electronic devices.

In an advantageous embodiment, the step of transmitting (100) a connection request from the electronic accessory 1 to the household appliance 2 is performed as a result of an action performed by a user on the electronic accessory 1.

For example, such an action can be moving the electronic accessory 1 according to a prefixed path, which can be detected by the one or more motion sensors 1*a* of the electronic accessory 1 and communicated to a logic unit, not illustrated, of the electronic accessory 1, which causes the latter to transmit the connection request by the first wireless communication system 1*b*.

In an advantageous embodiment, the electronic accessory 1 comprises a first input device 1*c*, for example a button; in this case, the step of transmitting (100) the connection request can be performed as a result of a user operating the first input device 1*c* (for example by pushing a button).

According to the invention, after transmitting (100) the connection request to the household appliance 2, the method comprises the step (schematically illustrated for example in FIG. 2) of transmitting (200), by means of the second wireless communication system 2*b*, an identification code request from the household appliance 2 to the computer network 3; preferably, such step of transmitting (200) is performed by using the Wi-Fi standard.

In an advantageous embodiment, the household appliance 2 comprises a user interface 2*d*, for example a touch screen, and the method comprises, after transmitting (100) the connection request from the electronic accessory 1 to the household appliance 2, and before transmitting (200) the identification code request from the household appliance 2 to the computer network 3, the step of confirming the intention to connect the household appliance 2 to the electronic accessory 1 by operating the user interface 2*d*.

The method according to the invention comprises, after transmitting (200) the identification code request to the computer network 3, the further step (schematically illustrated for example in FIG. 3) of generating (300) an identification code by means of a network processing unit 3*a* comprised in the computer network 3.

Advantageously, the network processing unit 3*a* can be a computer or a server.

Advantageously, the network processing unit 3*a* is provided with an identification code generation algorithm generating the identification code; advantageously, such an algorithm can be implemented in a software loaded in the network processing unit 3*a*.

Advantageously, the identification code generated by the network processing unit 3*a* can comprise one or more ASCII characters, as for example letters, numbers, special characters, symbols, spaces, images, etcetera.

Figure 4:
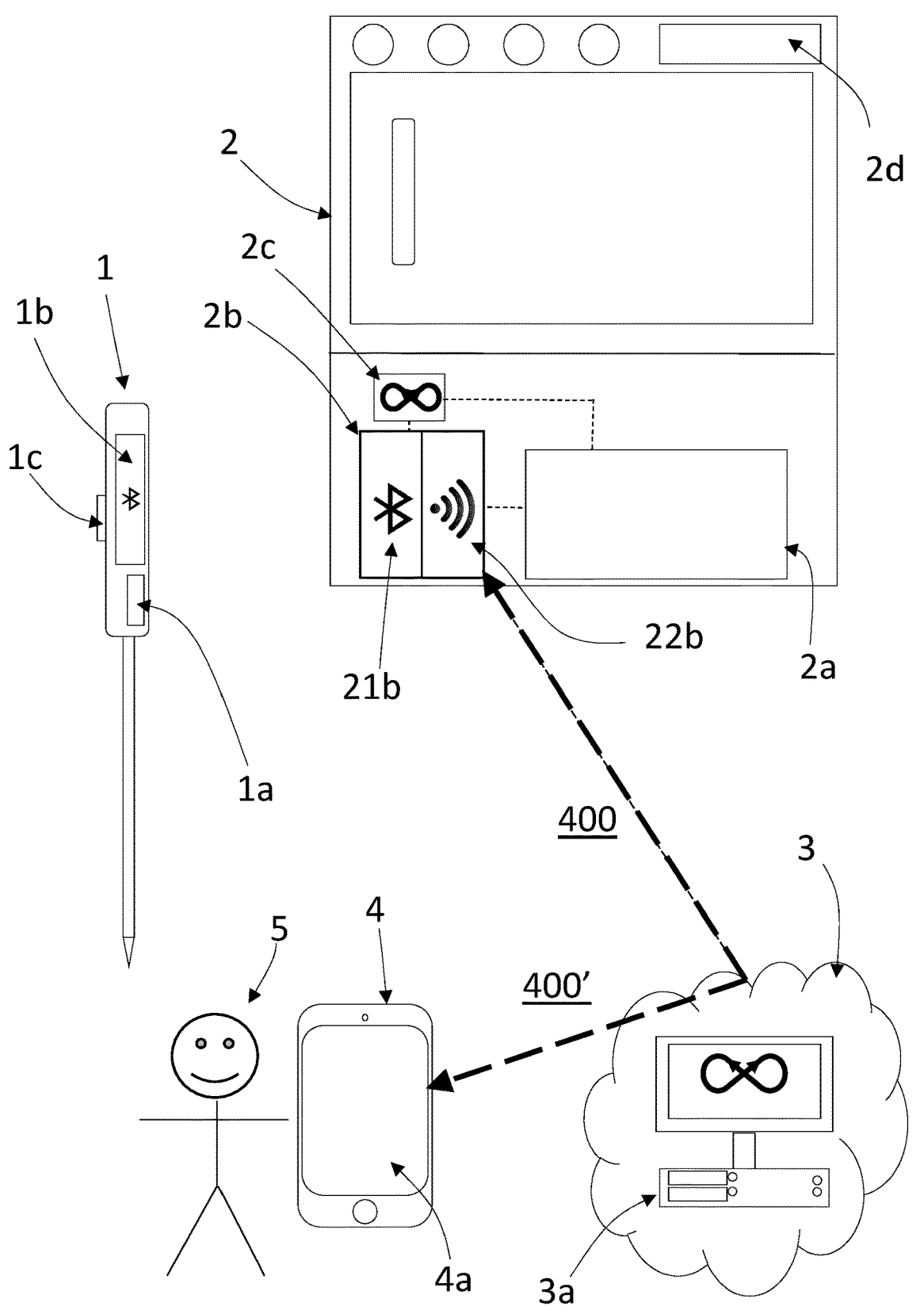
Figure 5:
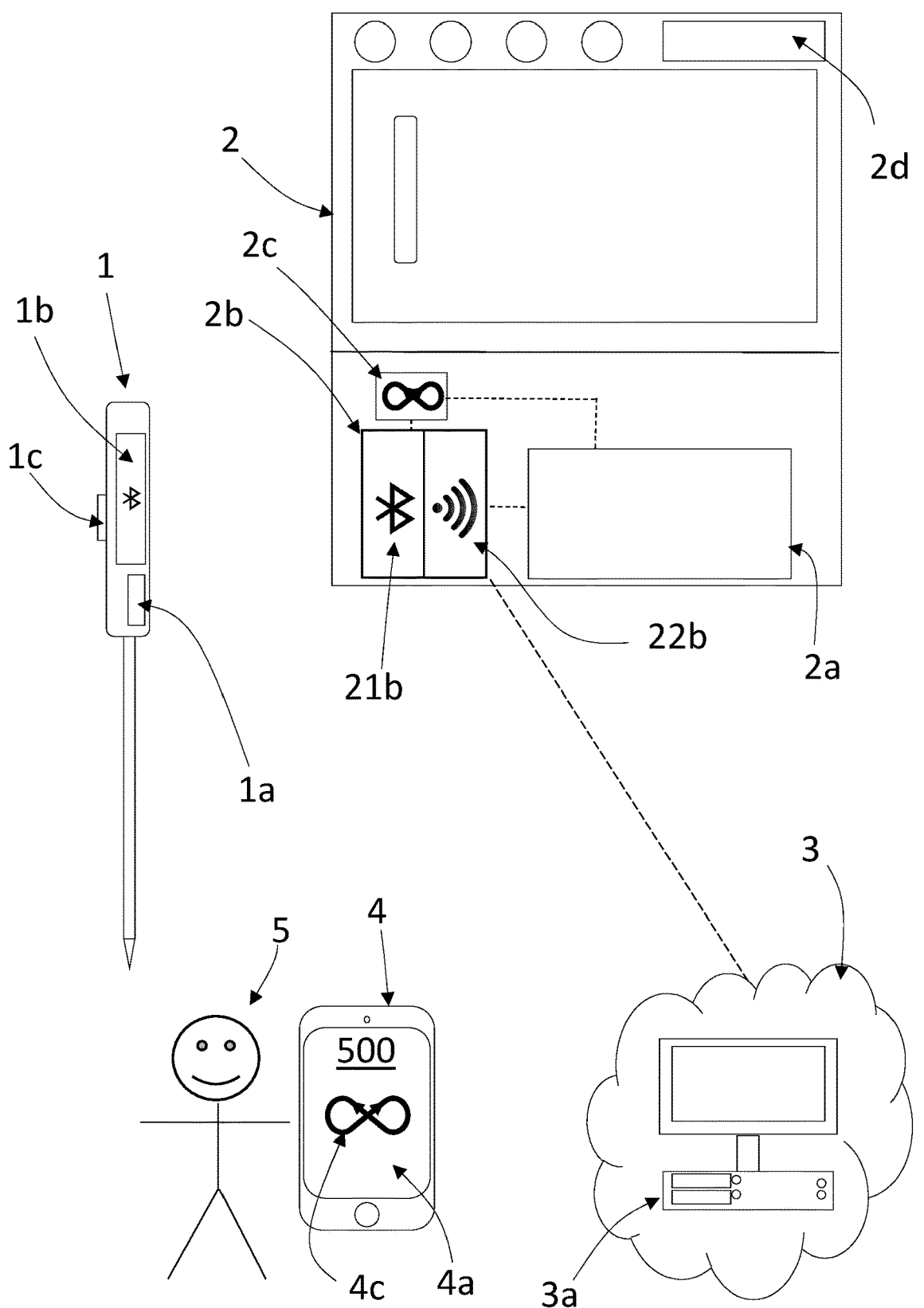
Figure 6:
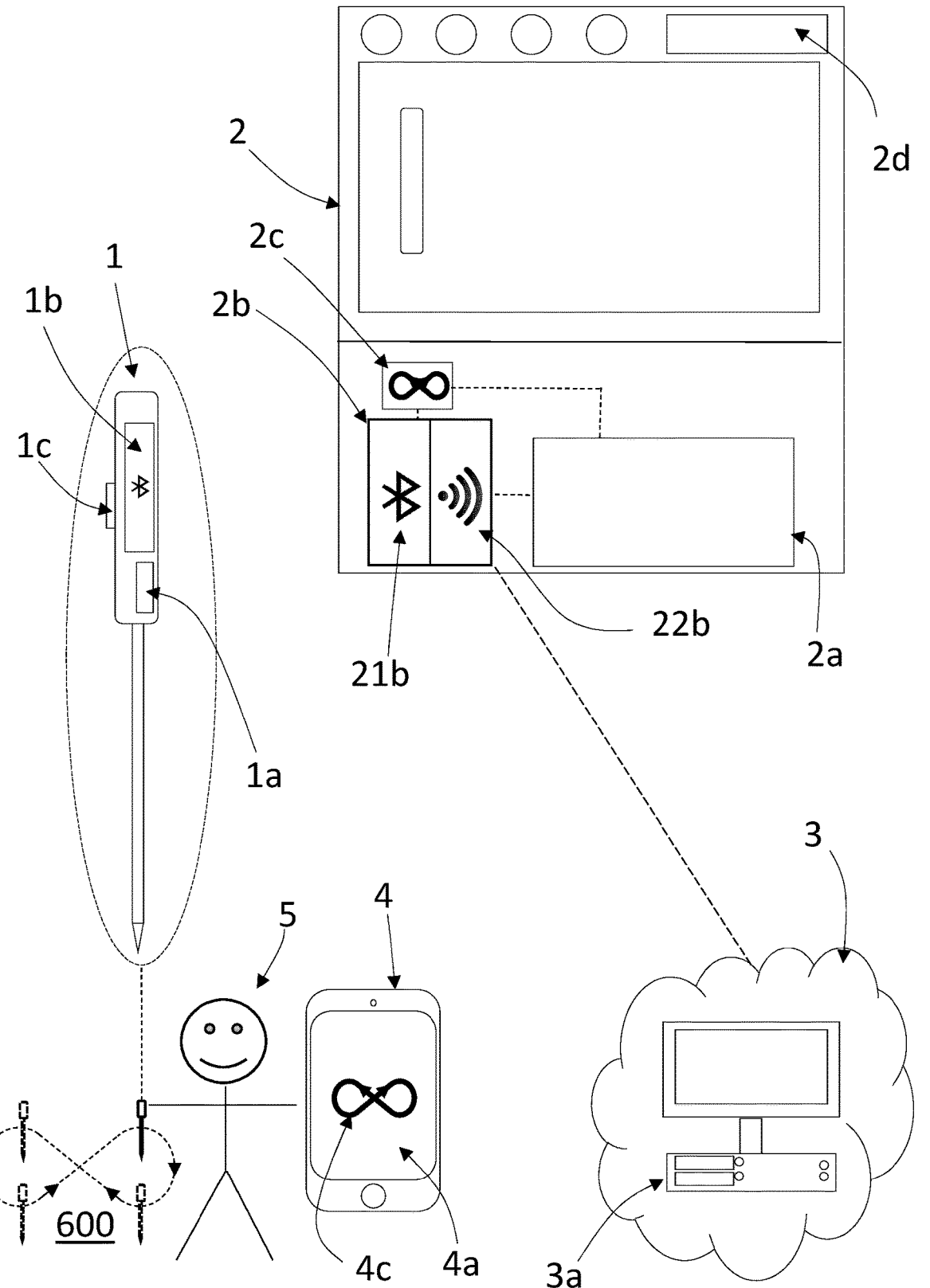
Figure 7:
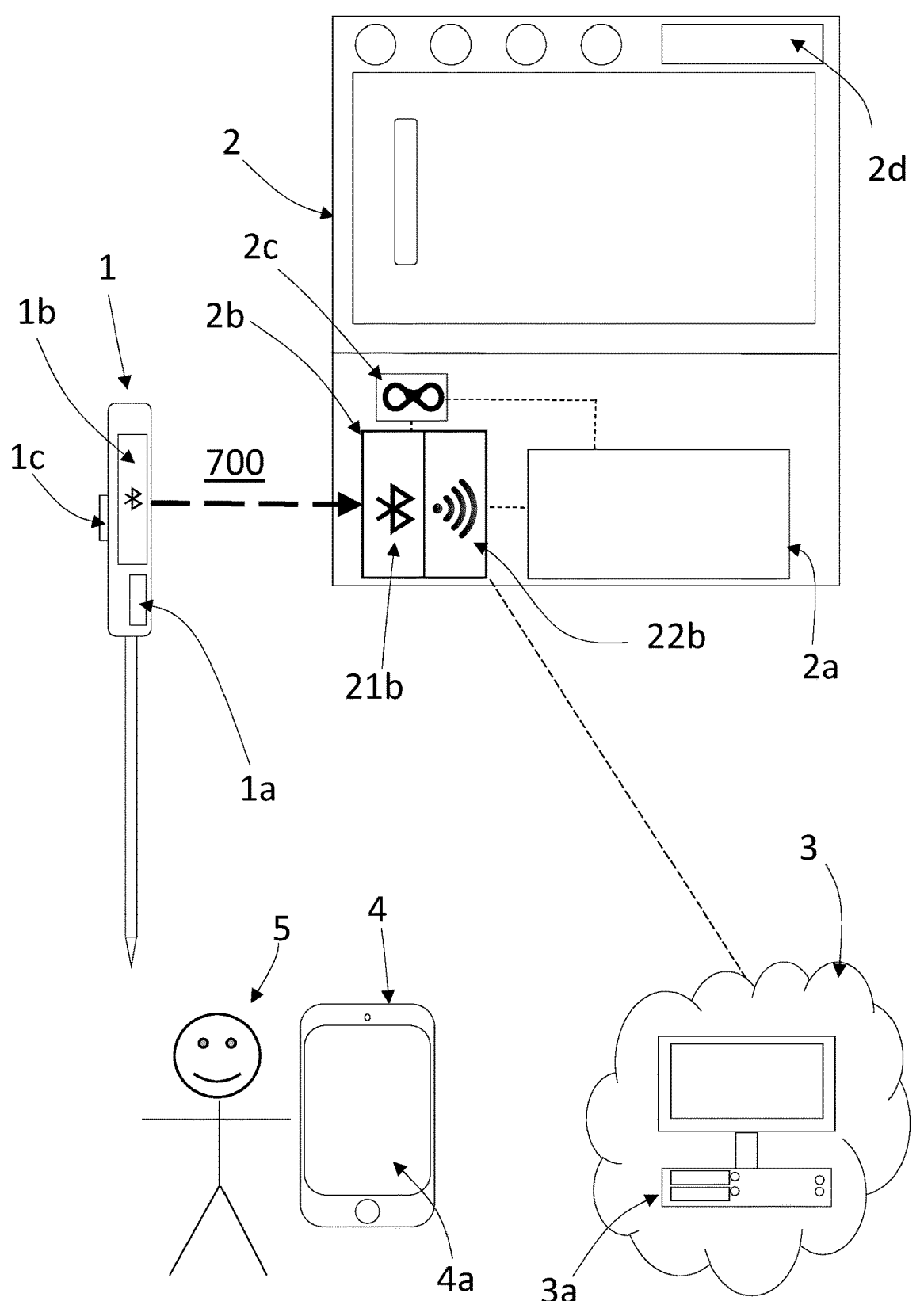
Figure 8:
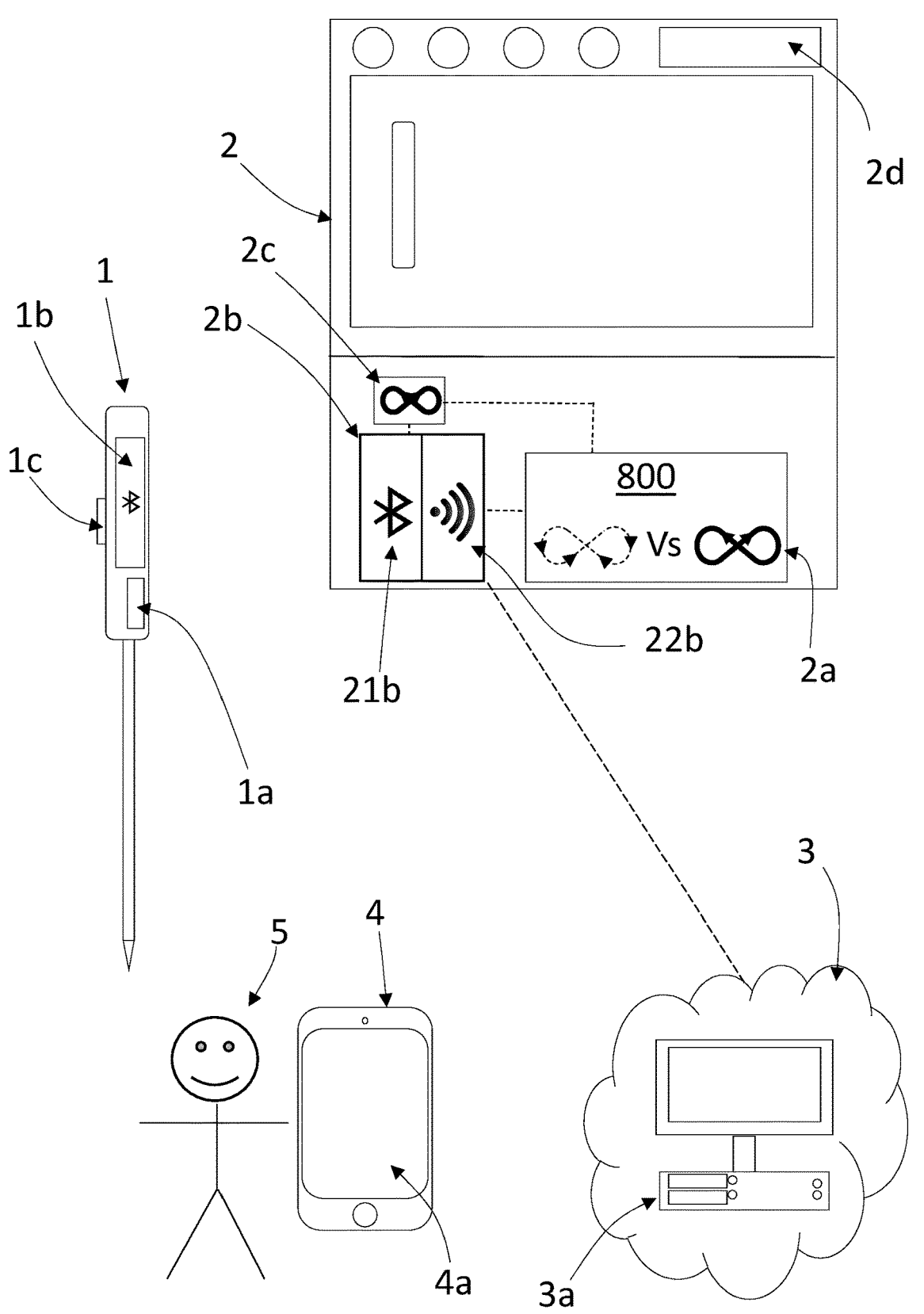
Figure 9:
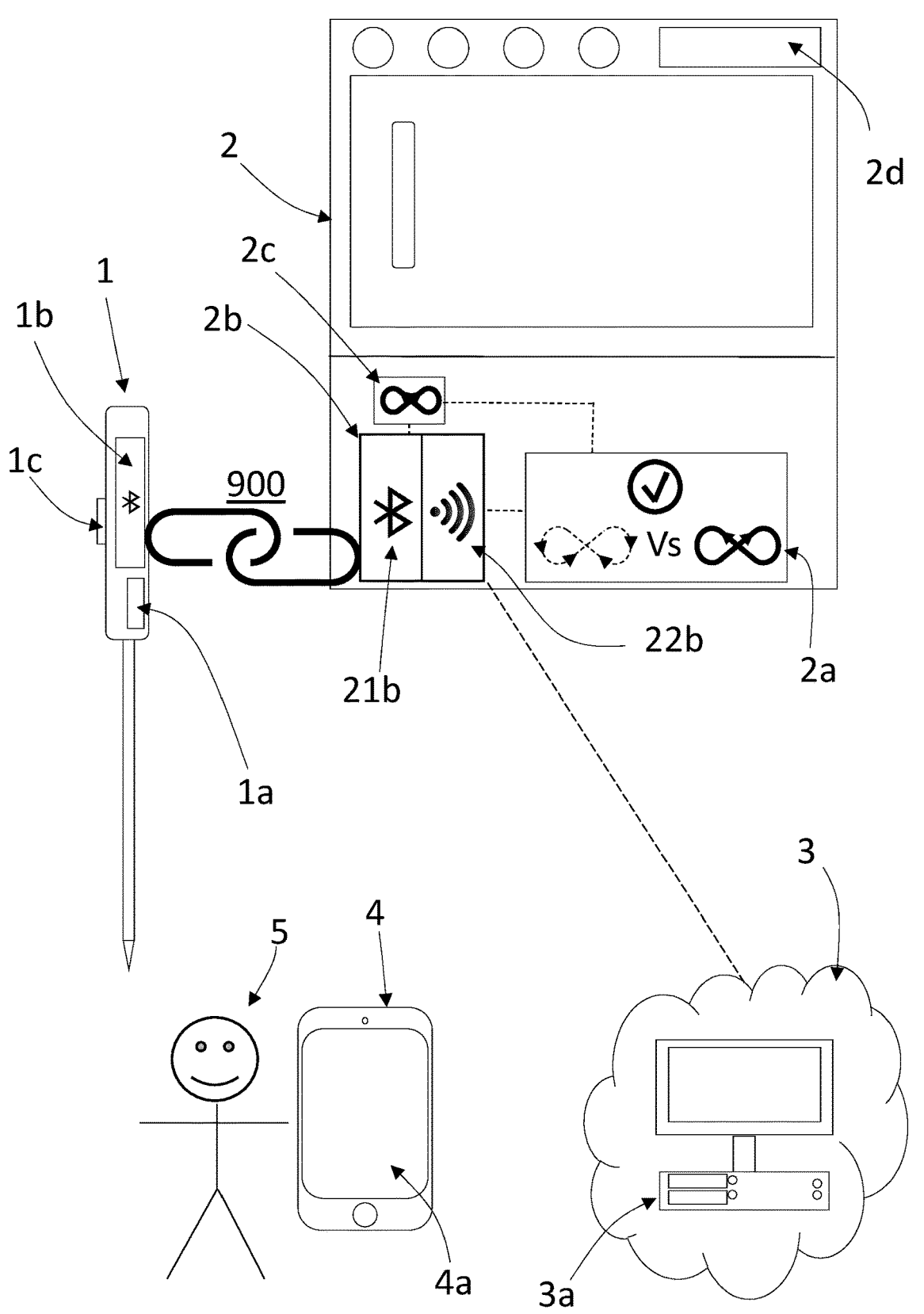

After generating the identification code, the method according to the invention comprises the step (an advantageous embodiment of which is schematically illustrated for example in FIG. 4) of transmitting (400) such an identification code to the household appliance 2 (which then stores it in the memory unit 2*c*) and transmitting (400') the identification code to a portable device 4 wirelessly connected to the computer network 3 and provided with a display 4*a*.

Advantageously, the portable device 4 can be a smartphone (like in the example of attached figures), or a tablet, or a smartwatch, or a portable computer, etcetera.

The portable device 4 is configured in such a way to display on its display 4*a* one or more movements to be performed by the electronic accessory 1, uniquely corresponding to the identification code; for example, the portable device 4 can be provided with a software or an application configured for converting the identification code in one or more graphic objects displayed in the display 4*a* and suitable for indicating one or more movements to a user 5.

In an advantageous embodiment, like for example the one illustrated in FIG. 4, the steps of transmitting (400) the identification code to the household appliance 2 and transmitting (400') the identification code to the portable device 4 are carried out substantially at the same time.

In a further advantageous embodiment, not illustrated, the steps of transmitting (400) the identification code to the household appliance 2 and transmitting (400') the identification code to the portable device 4 are carried out at different times (e.g. first to the portable device 4 (400') and then to the household appliance 2 (400), or vice versa).

In another advantageous embodiment, also not illustrated, wherein the portable device 4 is wirelessly connected to the household appliance 2, the identification code is first transmitted from the computer network 3 to the portable device 4, and then from the portable device 4 to the household appliance 2.

The method according to the invention comprises, after transmitting the identification code to the household appliance 2 and to the portable device 4, the step (schematically illustrated for example in FIG. 5) of displaying (500), by the display 4*a* of the portable device 4, one or more movements to be performed by the electronic accessory 1, uniquely corresponding to the identification code.

The one or more movements to be performed can be represented by one or more graphical symbols or elements, static or dynamic, for example one or more arrows and/or lines and/or words, indicating corresponding directions and/or paths along which to move the electronic accessory 1; in the advantageous embodiment of attached figures, the one or more movements are represented, for example, by a line 4*c* shaped as the infinity symbol, having some arrows indicating the direction of the movement.

The method according to the invention comprises, after displaying such one or more movements to be performed by the electronic accessory 1, the step (schematically illustrated for example in FIG. 6) of moving (600) the electronic accessory 1 in such a way as to reproduce the displayed one or more movements, and of detecting, by means of the one or more motion sensors 1*a*, the one or more movements performed by the electronic accessory 1 while reproducing such one or more movements.

The method according to the invention comprises, simultaneously to or after detecting the one or more movements performed by the electronic accessory 1, the step (schematically illustrated for example in FIG. 7) of transmitting (700) to the household appliance 2, by means of the first wireless communication system 1*b*, a movement information uniquely corresponding to the detected movements.

It is underlined that the movement information can be the original data detected by the one or more motion sensors 1*a* during the movement of the electronic accessory 1 for reproducing the displayed one or more movements, or processed data obtained by processing such original data, for example by a logic unit, not illustrated, of the electronic accessory 1.

The method according to the invention also comprises, after transmitting to the household appliance 2 the movement information, the step (schematically illustrated for example in FIG. 8) of comparing (800), by means of the processing unit 2*a* of the household appliance 2, the movement information, or a uniquely corresponding information thereof, to the identification code stored in the memory unit 2*c* or to an identification information uniquely corresponding to such an identification code.

The method according to the invention further also comprises, after the step of comparing (800), the step (schematically illustrated for example in FIG. 9) of establishing (900) a trusted wireless connection between the electronic accessory 1 and the household appliance 2 if the movement information, or uniquely corresponding information thereof, is in a prefixed relation (for example it coincides, or coincides within a certain tolerance) with the identification code or identification information.

According to the invention, if the movement information, or uniquely corresponding information thereof, is not in the prefixed relation with the identification code or identification information, the trusted wireless connection between the electronic accessory 1 and the household appliance 2 is not established.

It is underlined that the information uniquely corresponding to the movement information can be obtained by processing the data of the movement information, for example by means of the processing unit 2*a* of the household appliance, for example in order to give to such data a format comparable with the format of the stored identification code or of an identification information uniquely corresponding to such an identification code; it is also underlined that the identification information uniquely corresponding to the identification code can be obtained, for example, by the processing unit 2*a*, by processing the data of the identification code.

It has been seen, therefore, how the invention achieves the proposed aim and objects, there being provided a method for pairing an electronic accessory provided with one or more motion sensors to a household appliance connected to a computer network, that allows to establish a trusted wireless connection therebetween without requiring such household appliance or electronic accessory to be provided with an input/output user interface.

In fact, thanks to the use of the display of a mobile device for displaying one or more movements to be performed by the electronic accessory, uniquely corresponding to an identification code generated by a network processor unit of the computer network, and thanks to the use of the one or more motion sensors of the electronic accessory for detecting the movement of the electronic accessory, SO that it is possible to check if the detected movement corresponds to the displayed one or more movements, it is possible to use the movement of the electronic accessory as a sort of password or pin code for establishing a trusted wireless connection with the household appliance, without requiring an input/output device (as it will be required for using a "traditional" identification code like for example an alphanumeric password) neither in the household appliance nor in the electronic accessory.

In addition, by implementing the identification code generation algorithm in the network processing unit of the computer network and not, for example, in the household appliance or in the electronic accessory, it is possible to have a much higher computing power and therefore a more complex and safer identification code generation algorithm.

Moreover, since the identification code is generated by a network processing unit of the computer network, it is possible to keep updated the identification code generation algorithm directly at the network processing unit, so as to improve the safety of the process, without the need of periodically changing the software/firmware of the electronic accessory or of the household appliance in order to keep updated the identification code generation algorithm.

Furthermore, since the identification code is generated by a network processing unit of the computer network, by operating such network processing unit the identification code, and the corresponding one or more movements to be performed by the electronic accessory, can be easily adapted, in a centralized manner, to the specific electronic accessory (for example it can be provided a complex sequence of movements for a lightweight temperature probe, and an easier sequence for a heavyweight pan).

In addition, on the user's side, the method requires only to move the electronic accessory according to the displayed one or more movements, which is easy ad immediate to be understood and performed.

Further variants of the embodiments described above are possible, without departing from the teachings of the invention.

The invention claimed is:

1. A method for pairing an electronic accessory provided with one or more motion sensors to a household appliance connected to a computer network comprising a network processing unit, in order to establish a trusted wireless connection therebetween, wherein said electronic accessory comprises a first wireless communication system, and said household appliance comprises a processing unit, a second wireless communication system and a memory unit, the method comprising:

transmitting a connection request from said electronic accessory to said household appliance, by means of said first wireless communication system;

after transmitting said connection request to said household appliance, transmitting, by means of said second wireless communication system, an identification code request from said household appliance to said computer network;

after transmitting said identification code request to said computer network, generating an identification code by means of the network processing unit, transmitting said identification code to said household appliance and transmitting said identification code to a portable device wirelessly connected to said computer network and provided with a display, said household appliance storing said identification code in said memory unit;

after transmitting said identification code to said portable device, displaying, by said display of said portable device, an information related to one or more movements to be performed by said electronic accessory, uniquely corresponding to said identification code;

after displaying, by means of said display of said portable device, the information related to said one or more movements to be performed by said electronic accessory, moving said electronic accessory in such a way as to reproduce said one or more movements, and detecting said one or more movements performed by said electronic accessory while reproducing said one or more movements by means of said one or more motion sensors;

simultaneously to or after detecting said one or more movements performed by said electronic accessory, transmitting to said household appliance, by means of said first wireless communication system, a movement information uniquely corresponding to said detected one or more movements;

after transmitting to said household appliance said movement information, comparing, by means of said processing unit, said movement information, or a uniquely corresponding information thereof, to said identification code stored in said memory unit or to an identification information uniquely corresponding to said identification code, and establishing a trusted wireless connection between said electronic accessory and said household appliance if said movement information, or said uniquely corresponding information thereof, is in a prefixed relation with said identification code or identification information uniquely corresponding to said identification code.

2. The method of claim 1, wherein transmitting said identification code to said household appliance and transmitting said identification code to said portable device are executed substantially at the same time.

3. The method of claim 1, wherein transmitting said identification code to said household appliance and transmitting said identification code to said portable device are executed at different times.

4. The method of claim 1, wherein said portable device is wirelessly connected to said household appliance, and wherein said identification code is first transmitted from said computer network to said portable device, and then from said portable device to said household appliance.

5. The method of claim 1, wherein transmitting a connection request from said electronic accessory to said household appliance is performed as a result of an action performed by a user on said electronic accessory.

6. Method, as in claim 5, wherein transmitting a connection request from said electronic accessory to said household appliance is performed as a result of said one or more motion sensors detecting a prefixed motion of said electronic accessory.

7. The method of claim 5, wherein said electronic accessory comprises a first input device, and wherein transmitting a connection request from said electronic accessory to said household appliance is performed as a result of a user operating said first input device.

8. The method of claim 1, wherein said household appliance comprises a user interface, and wherein said method comprises, after transmitting the connection request from said electronic accessory to said household appliance, and before transmitting, by means of said second wireless communication system, an identification code request from said household appliance to said computer network, a step of confirming an intention to connect said household appliance to said electronic accessory by operating said user interface.

9. The method of claim 1, wherein said trusted wireless connection between said electronic accessory and said household appliance is a Bluetooth connection, or a Bluetooth low energy connection.

10. The method of claim 1, wherein said trusted wireless connection between said household appliance and said computer network is a Wi-Fi connection.

11. The method of claim 1, wherein said second wireless communication system comprises a Bluetooth module, operating according to a Bluetooth standard or to a Bluetooth Low Energy standard.

12. The method of claim 1, wherein said second wireless communication system comprises a Wi-Fi module, operating according to the Wi-Fi standard.

13. The method of claim 1, wherein said one or more motion sensors comprise an accelerometer and/or a gyroscope.

14. The method of claim 1, wherein said computer network comprises a LAN network, a MAN network, a WAN network, or the Internet.

15. The method of claim 1, wherein said portable device is a smartphone, or a tablet, or a smartwatch, or a portable computer.

16. The method of claim 1, wherein said one or more movements to be performed by said electronic accessory is displayed by said display as one or more arrows and/or one or more lines and/or one or more texts, indicating in which direction or directions or along which path said electronic accessory has to be moved in order to perform said one or more movements.

17. The method of claim 1, wherein said electronic accessory is a temperature probe, or a pan or a pot provided with one or more electronic functions, or an accessory, provided with one or more sensors, configured to be loaded in a laundry treating chamber of a laundry washing machine or laundry dryer or washer-drier to monitor one or more properties and/or physical quantities related to the laundry and/or to a fluid contained in said laundry treating chamber, or a stain removal pen, or an air quality sensor for fridges, or a bottle temperature monitor, or a cap for a bottle comprising one or more sensors for detecting one or more properties and/or physical quantities related to a liquid contained in said bottle, or a stand-alone filter with capability to notify when filtering element should be changed, or a digital camera.

18. The method of claim 1, wherein said network processing unit is or comprises a computer or a server.

19. The method of claim 1, wherein said network processing unit is provided with an identification code generation algorithm generating said identification code.

20. The method of claim 19, comprising updating and/or modifying said identification code generation algorithm directly at said network processing unit.

21. The method of claim 19, comprising adapting said identification code generation algorithm to a specific electronic accessory in a centralized manner, at said network processing unit.

22. The method of claim 1, wherein, if said movement information, or uniquely corresponding information thereof, is not in said prefixed relation with said identification code or identification information, the trusted wireless connection between said electronic accessory and said household appliance is not established.

23. A household appliance comprising:

a processing unit;

a wireless communication system configured to connect the household appliance to a computer network; and a memory unit, the wireless communication system further being configured to receive a connection request from a wireless communication system of an electronic accessory, transmit an identification code request to said computer network, receive an identification code having been generated by means of a network processing unit comprised in said computer network, and receive, from the electronic accessory, a movement information uniquely corresponding to one or more movements of the electronic accessory detected by means of one or more motion sensors of the electronic accessory;

the memory unit being configured to store the received identification code; and the processing unit configured to compare said movement information, or a uniquely corresponding information thereof, to said identification code stored in said memory unit or to an identification information uniquely corresponding to said identification code, wherein a trusted wireless connection between the electronic accessory and the household appliance is established if said movement information, or said uniquely corresponding information thereof, is in a prefixed relation with said identification code or said identification information uniquely corresponding to said identification code.

24. A system comprising:

a household appliance according to claim 23, and at least one out of:

a computer network comprising a network processing unit, the household appliance being configured to connect to the computer network using the wireless communication system and the computer network being configured to receive an identification code request from said household appliance, generate an identification code by means of the network processing unit, transmit said identification code to said household appliance and transmit said identification code to a portable device wirelessly connected to said computer network;

a portable device configured to wirelessly connect to said computer network and comprising a display, the portable device configured to receive an identification code from said computer network and display, on said display, information related to one or more movements, uniquely corresponding to the received identification code, to be performed by an electronic accessory; and an electronic accessory comprising a wireless communication system and one or more motion sensors, the electronic accessory being configured to transmit a connection request, by means of the wireless communication system of the electronic accessory, detect one or more movements performed by said electronic accessory using said one or more motion sensors and transmit to said household appliance, by means of said wireless communication system of the electronic accessory, movement information uniquely corresponding to the detected one or more movements.

* * * * *